(12) United States Patent
Fronius et al.

(10) Patent No.: US 8,156,848 B2
(45) Date of Patent: Apr. 17, 2012

(54) TOOL HEAD WITH ADJUSTING MOTOR

(75) Inventors: Juergen Fronius, Stuttgart (DE); Roland Hoerl, Boennigheim (DE)

(73) Assignee: Komet Group GmbH, Besigheim (DE)

( * ) Notice: Subject to any disclaimer, the term of this patent is extended or adjusted under 35 U.S.C. 154(b) by 986 days.

(21) Appl. No.: 11/991,484

(22) PCT Filed: Jul. 22, 2006

(86) PCT No.: PCT/EP2006/007226
§ 371 (c)(1), (2), (4) Date: Mar. 4, 2008

(87) PCT Pub. No.: WO2007/031147
PCT Pub. Date: Mar. 22, 2007

(65) Prior Publication Data
US 2009/0249925 A1    Oct. 8, 2009

(30) Foreign Application Priority Data

Sep. 13, 2005  (DE) .......................... 10 2005 043 851

(51) Int. Cl.
*B23B 29/00* (2006.01)
*B23B 41/00* (2006.01)
(52) U.S. Cl. .......................................... 82/1.2; 408/153
(58) Field of Classification Search .............. 82/1.2, 82/173, 1.4, 4.8, 153, 72, 79, 100, 118, 119, 82/88, 89, 113, 134, 903, 905; 408/168, 408/158, 173, 178, 163, 165, 172, 153; 407/9, 407/10, 11, 37
See application file for complete search history.

(56) References Cited

U.S. PATENT DOCUMENTS

| 4,067,251 | A  |   | 1/1978  | Eckle et al. |
| 4,167,218 | A  | * | 9/1979  | Horiuchi et al. ............... 173/213 |
| 5,664,470 | A  | * | 9/1997  | Garnett et al. ................... 82/121 |
| 5,807,037 | A  |   | 9/1998  | Schneider et al. |
| 5,836,727 | A  |   | 11/1998 | Scheer |
| 6,053,082 | A  |   | 4/2000  | Rupp et al. |
| 6,134,996 | A  |   | 10/2000 | Scheer et al. |
| 6,280,124 | B1 | * | 8/2001  | Ammann ....................... 408/129 |
| 6,655,883 | B2 |   | 12/2003 | Maar |

(Continued)

FOREIGN PATENT DOCUMENTS

DE    2 165 096    6/1972

(Continued)

OTHER PUBLICATIONS

Germany Patent Office Search Report dated Nov. 16, 2005 (4 pages).

(Continued)

*Primary Examiner* — Ghassem Alie
(74) *Attorney, Agent, or Firm* — Flynn, Thiel, Boutell & Tanis, P.C.

(57) ABSTRACT

A tool head includes a working slide which can be adjusted relative to a basic body, and an electric adjusting motor which acts on the working slide via gears. The motor includes a stator and a rotor which runs round in the stator, bears an output shaft and is mounted in two pivot bearings arranged at a distance from one another, wherein one of the pivot bearings is arranged with an outer ring in a basic body-mounted stator housing and with an inner ring directly or indirectly on the output shaft.

9 Claims, 1 Drawing Sheet

U.S. PATENT DOCUMENTS

| | | | |
|---|---|---|---|
| 7,311,482 B2 * | 12/2007 | Sugita et al. | 409/231 |
| 7,320,567 B2 * | 1/2008 | Greif et al. | 409/233 |
| 2003/0002938 A1 | 1/2003 | Maar | |

FOREIGN PATENT DOCUMENTS

| | | |
|---|---|---|
| DE | 2 158 717 | 8/1973 |
| DE | 76 06 473 | 8/1977 |
| DE | 32 12 014 A1 | 12/1982 |
| DE | 43 30 822 A1 | 3/1995 |
| DE | 44 21 583 A1 | 3/1995 |
| DE | 198 13 615 C2 | 11/1999 |
| DE | 199 51 658 A1 | 5/2001 |
| EP | 0 340 681 A2 | 11/1989 |
| EP | 1 222 983 A2 | 7/2002 |
| WO | WO 02/103883 A1 | 12/2002 |
| WO | WO 2004/030186 A1 | 4/2004 |

OTHER PUBLICATIONS

International Search Report dated Dec. 12, 2006 (4 pages).
PCT Written Opinion of International Searching Authority (PCT/ISA/237) dated Dec. 12, 2006 (4 pages).

* cited by examiner

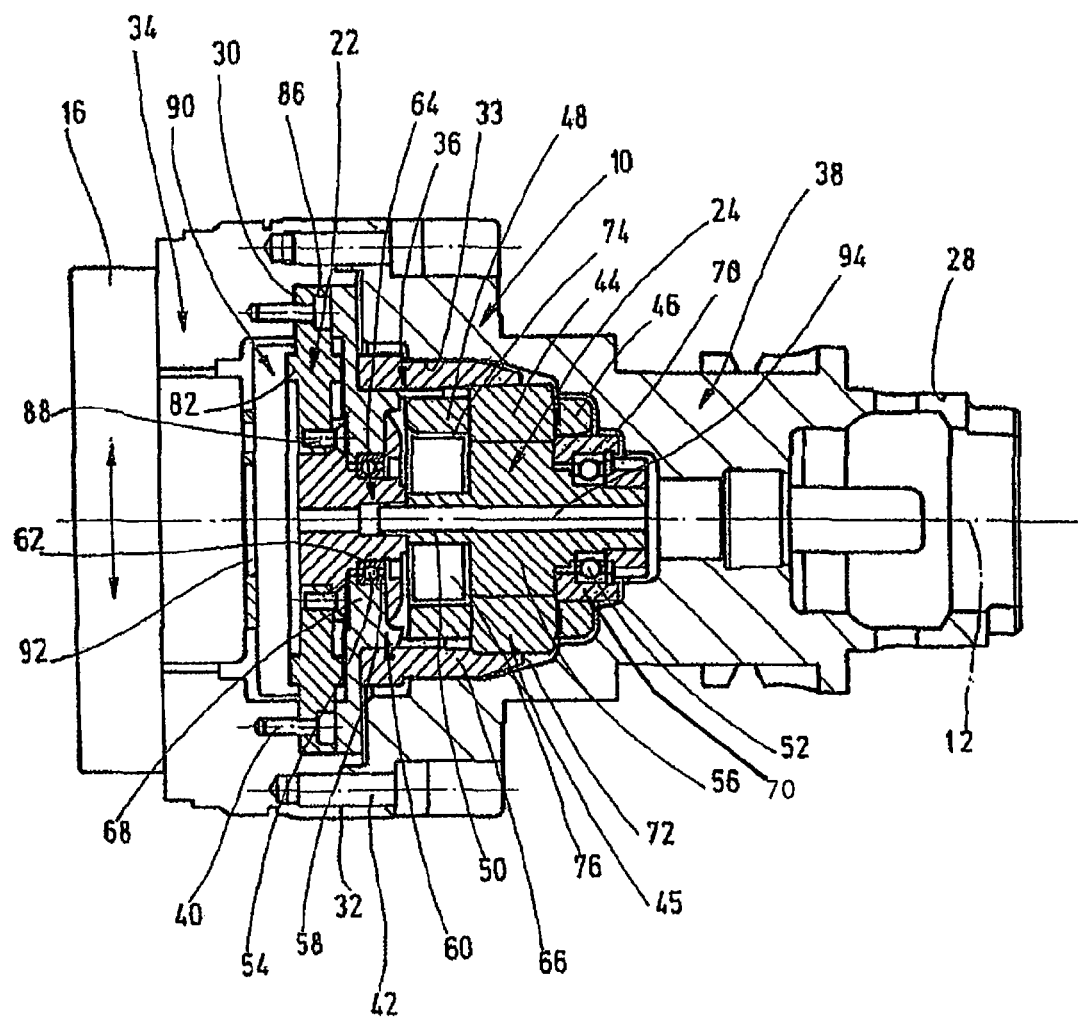

TOOL HEAD WITH ADJUSTING MOTOR

FIELD OF THE INVENTION

The invention relates to a tool head for use in machine tools comprising a base body, comprising at least one working slide which can be adjusted in relation to the base body, and comprising an adjustment motor which is arranged in the base body and acts on the working slide via gear means, wherein the adjustment motor which is embodied as an electric motor has a stator which is arranged in the base body and a rotor which rotates in the stator, is fitted with an output shaft and is mounted in two rotary bearings which are arranged at a distance from one another, wherein one of the rotary bearings is arranged with an outer ring in a stator housing which is fixed to the base body and with an inner ring directly or indirectly on the output shaft.

DESCRIPTION OF THE RELATED ART

A tool head of the type mentioned at the beginning is known (EP-1 222 983 B1) in which the essentially cylindrical motor housing of the adjustment motor is arranged axially centrally in the base body, and in which the stator housing has a casing part which engages axially over the outside of the stator and is fixedly connected to the stator in terms of rotation and displacement and an end part which closes off the casing part on the side lying opposite the transmission and is fitted with the outer ring of the second rotary bearing. This design requires a joint between the drive assembly and a transmission assembly, which itself requires a correspondingly large amount of expenditure on mounting.

BRIEF SUMMARY OF THE INVENTION

Taking this as the basis, the invention is based on the object of improving the known tool head of the type mentioned at the beginning to the effect that the expenditure on mounting is reduced when the tool head is assembled, and a shorter assembly length can be achieved. The feature combination is proposed as a means of solving this problem.

The solution according to the invention consists primarily in the fact that the stator housing has a sleeve part which partially engages over the stator axially on the outside and is fixedly connected to the stator in terms of rotation and displacement, and a bearing cover which closes off the sleeve part on the gear side and is fitted with the outer ring of the first rotary bearing. The output shaft is expediently arranged coaxially with respect to the rotational axis of the base body here.

A preferred embodiment of the invention provides that the second rotary bearing is arranged in a separate centering ring which is secured to the stator on the inside, on the side facing away from the bearing cover. In contrast to the prior art, the centering ring is not directly associated with the stator housing. Between the sleeve part and the centering ring there is instead a gap in the housing which is spanned by a base body wall. The respective base body wall is adapted in its contour to the outer contour of the stator in the spanned area. The second rotary bearing is advantageously secured by its outer ring to the centering ring and by its inner ring to the rotor. The adjustment motor can be embodied here as an asynchronous motor or as a DC motor. The stator of the adjustment motor expediently has a laminated core which surrounds the rotor and has winding heads which protrude at the ends. A particularly compact design is achieved by virtue of the fact that the stator engages with the associated winding head and/or part of its laminated core in the sleeve part, open at one end, of the stator housing and is secured therein and centered, while the centering ring engages in a free space in the other winding head and/or in the laminated core and is secured therein and/or centered.

The sleeve part is advantageously bonded or cast to the laminated core and/or the adjacent winding head, while on the other side the centering ring is connected in a positively locking fashion to the adjacent winding head and/or the laminated core and/or is bonded or cast with it. On one of its front ends, the adjustment motor is fitted with an encoder which is preferably arranged in an annular free space within one of the winding heads.

A down step transmission which is embodied as a harmonic drive transmission whose input and output shafts are preferably arranged coaxially in the base body is preferably used as the gear means. The output shaft of the rotor of the adjustment motor preferably engages in a coaxial drive opening of the input shaft of the step down transmission, while the inner ring in the first rotary bearing can be connected in a rotationally fixed fashion to the input shaft of the step down transmission, and the output shaft of the rotor is mounted indirectly in the first rotary bearing by means of the input shaft.

A further preferred embodiment of the invention provides that the harmonic drive transmission has an oval drive plate which is preferably coupled to the output shaft of the adjustment motor via the input shaft, an internally toothed ring which is fixedly connected to the base body in terms of rotation and has a flexible, externally toothed sleeve which is coupled to the output shaft. The rotor shaft and the adjoining transmission parts advantageously have an axially central cavity which is embodied as a cooling duct or as a functional feed through.

In order to avoid magnetic interactions between the adjustment motor and the bearing parts, according to one preferred embodiment of the invention it is proposed that the centering ring which engages in the stator be composed of a magnetically impermeable material and that at least the second rotary bearing be embodied as a hybrid bearing whose roller body is composed of an electrically insulating material, preferably of ceramic.

One of the two rotary bearings, expediently forms a fixed bearing, and the other forms a freely moving bearing which can move axially in relation to the latter. This measure allows stresses within the drive system, which can occur, for example, when there are changes in temperature, to be avoided. The first rotary bearing is expediently embodied as a fixed bearing and the second rotary bearing is embodied as a freely moving bearing.

A further advantageous or alternative embodiment of the invention provides for the adjustment motor, the gear means and the adjustable working slide to form an enclosed assembly which is detachably connected via a joint to a connecting assembly which has a connecting stem. The connecting assembly has, in this case, an axially open receptacle for an axially protruding part of the combined drive/gear/slide assembly which is embodied in the shape of a cup and can be equipped with the respective parts of the open side.

The invention is explained below in more detail with reference to an exemplary embodiment which is illustrated in a schematic fashion in the drawing.

BRIEF DESCRIPTION OF THE DRAWING

The single FIGURE shows a longitudinal section through a tool head which is embodied, for example, as a facing head and which is intended for use in machine tools.

DETAILED DESCRIPTION OF THE INVENTION

The tool head is essentially composed of a base body 10 which can rotate about a rotational axis 12, a working slide 16 which can be displaced transversely with respect to the rotational axis 12 in the base body 10 and is fitted with a cutting tool (not illustrated), an electric adjustment motor 24 which acts on the working slide 16 with the intermediate connection of a step down transmission 22, and a tool stem 28 which protrudes axially over the base body 10 and which can be coupled to a machine spindle (not illustrated) of a machine tool.

The tool head is composed of three assemblies which are detachably connected to one another at joints 30, 32, a slide assembly 34 which holds the working slide 16, a drive assembly 36 which contains the adjustment motor 24 and the step down transmission 22, and a connecting assembly 38 which is fitted with the tool stem 28 and has a cup-shaped receptacle 33 in the region of the joint 32. The components of the drive assembly 36 and of the slide assembly 34 are premounted, forming a standard enclosed assembly, and are then inserted into the cup-shaped receptacle 33 of the connecting assembly 38. The connection between the assemblies is made by means of screws 40, 42 which run axis-parallel.

The adjustment motor 24 is arranged axially centrally in the base body 10. The exemplary embodiments shown are an electric motor which is embodied, for example, as an asynchronous motor and is composed of an annular laminated core 44 located on the outside, and stator 45 having two axially protruding winding heads 46, 48, and a rotor 56 which rotates in the stator, is fitted with an output shaft 50 and is mounted in two rotary bearings 52, 54 which are arranged at a distance from one another. One of the rotary bearings 54 is arranged with an outer ring 58 in a stator housing 60 which is fixed to the base body and with an inner ring 62 which is arranged on the output shaft 50 of the adjustment motor 24, indirectly via a drive shaft 64 of the step down transmission 22.

A particular feature of the invention is that the stator housing 60 has a sleeve part 66 which partially engages over the stator 45 axially on the outside and is fixedly connected to the laminated core 44 of the stator in terms of rotation and displacement, and a bearing cover 68 which closes off the sleeve part on the gear side and is fitted with the outer ring 58 of the rotary bearing 54. The bearing cover 68 and the sleeve part 66 may be constructed from one or more parts.

The other rotary bearing 52 is arranged in a separate centering ring 70 which is secured, on the side facing away from the bearing cover 68 of the stator housing 60, on the rear winding head 46 on the inside or in the laminated core 44. Between the free end 72 of the sleeve part 66 and the centering ring 70 there is a gap in the housing which is spanned by the inner face of the base body 10 in the region of the cup-shaped receptacle 33. It has proven particularly advantageous if the centering ring 70 is bonded or cast in the interior of the stator 45 directly with the winding head 46 and/or the laminated core 44. The connection between the sleeve part 66 and the stator 45 can also be made in a materially joined fashion by means of an adhesive or a sealing compound.

Within the front winding head 48 there is an annular free space 74 which can be used to accommodate an encoder 76 which is arranged between the stator and rotor.

The step down transmission 22 is expediently a harmonic drive transmission whose oval drive plate 82 is coupled by means of the engine-end output shaft 50 and the gear-end drive shaft 64, whose internally toothed ring 86 is connected fixedly in terms of rotation to the base body 10 in the region of the drive assembly 36 using the screws 40, and whose flexible, externally toothed sleeve 90 is coupled to the output shaft 92. In the rotor 56 of the adjustment motor 24 and in the step down transmission 22 there is a central functional duct 94 to which a cooling lubricant can be applied, for example from the machine side. On the slide assembly side, the duct 94 is made to extend as far as the blade of the cutting tool (not illustrated).

To summarize, the following is to be noted: the invention relates to a tool head for use in machine tools. The tool head has at least one working slide 16 which can be adjusted in relation to a base body 10, and has an adjustment motor 24 which is arranged in the base body 10 and acts on the working slide 16 via gear means 22. The adjustment motor which is embodied as an electric motor has a stator 45 which is arranged in the base body and a rotor 56 which rotates in the stator, is fitted with an output shaft 50 and is mounted in two rotary bearings 52, 54 which are arranged at a distance from one another, wherein one of the rotary bearings 54 is arranged with an outer ring 58 in a stator housing 60 which is fixed to the base body and with an inner ring 62 directly or indirectly on the output shaft 50. According to the invention, the stator housing 60 has a sleeve part 66 which partially engages over the stator axially on the outside and is fixedly connected to the stator 45 in terms of rotation and displacement, and a bearing cover 68 which closes off the sleeve part on the gear side and is fitted with the outer ring 58 of the first rotary bearing 54. The second rotary bearing 52 is arranged in a separate centering ring 70 which is secured to the stator 45 on the inside on the side facing away from the bearing cover of the stator housing.

The invention claimed is:

1. A tool head for use in machine tools comprising a base body, at least one working slide which can be adjusted in relation to the base body and an adjustment motor arranged in the base body and acting on the working slide via a transmission member, wherein the adjustment motor has a stator arranged in the base body and a rotor which rotates in the stator, is fitted with an output shaft and is mounted in two rotary bearings which are arranged at a distance from one another, one of the rotary bearings is arranged with an outer ring in a stator housing which is fixed to the base body and with an inner ring directly or indirectly on the output shaft, and the stator housing has a sleeve part which partially engages over the stator axially on the outside and is fixedly connected to the stator in terms of rotation and displacement, and a bearing cover which closes off the sleeve part on a gear side and is fitted with the outer ring of a first rotary bearing.

2. The tool head as claimed in claim 1, wherein the output shaft is arranged coaxially with respect to the rotational axis of the base body.

3. The tool head as claimed in claim 1, wherein the other rotary bearing is arranged in a separate centering ring which is secured to the stator on the inside, on the side facing away from the bearing cover of the stator housing.

4. The tool head as claimed in claim 3, wherein the other rotary bearing is secured by its outer ring to the centering ring and by its inner ring to the rotor.

5. The tool head as claimed in claim 1, wherein the adjustment motor is embodied as an asynchronous motor or as a DC motor.

6. The tool head as claimed in claim 3, wherein the centering ring engages in a free space within a winding head and/or laminated core and is secured therein and centered.

7. The tool head as claimed in claim 6, wherein the centering ring is bonded or cast with the associated winding head and/or the laminated core.

8. The tool head as claimed in claim 3, wherein the centering ring which engages in the stator is composed of a magnetically impermeable material.

9. The tool head as claimed in claim 3, wherein at least the other rotary bearing is embodied as a hybrid bearing whose roller body is composed of an electrically insulating material.

* * * * *